United States Patent
Tanaka et al.

(10) Patent No.: US 8,586,882 B2
(45) Date of Patent: Nov. 19, 2013

(54) MULTI-DIRECTIONAL SWITCH

(75) Inventors: Tsuyoshi Tanaka, Kyoto (JP); Hitokazu Shitanaka, Osaka (JP); Hideaki Eto, Osaka (JP)

(73) Assignee: Panasonic Corporation, Osaka (JP)

( * ) Notice: Subject to any disclaimer, the term of this patent is extended or adjusted under 35 U.S.C. 154(b) by 262 days.

(21) Appl. No.: 13/153,581

(22) Filed: Jun. 6, 2011

(65) Prior Publication Data

US 2011/0303519 A1 Dec. 15, 2011

(30) Foreign Application Priority Data

Jun. 11, 2010 (JP) ................................. 2010-133633
Nov. 15, 2010 (JP) ................................. 2010-254684

(51) Int. Cl.
*H01H 25/00* (2006.01)

(52) U.S. Cl.
USPC ............... 200/5 R; 338/47; 338/99; 200/5 A; 200/512

(58) Field of Classification Search
USPC ...... 200/5 R, 5 A, 6 A, 4, 339, 553, 511–512; 338/47, 99, 114
See application file for complete search history.

(56) References Cited

U.S. PATENT DOCUMENTS

| | | | |
|---|---|---|---|
| 6,437,682 B1 * | 8/2002 | Vance | 338/185 |
| 6,559,831 B1 * | 5/2003 | Armstrong | 345/159 |
| 6,794,982 B2 * | 9/2004 | Inoue et al. | 338/47 |
| 6,841,743 B2 * | 1/2005 | Okada et al. | 200/6 A |
| 7,465,896 B2 * | 12/2008 | Sawada et al. | 200/329 |
| 7,960,667 B2 * | 6/2011 | Yoshihara et al. | 200/516 |
| 2005/0284737 A1 | 12/2005 | Shitanaka et al. | |

FOREIGN PATENT DOCUMENTS

JP 2006-012695 1/2006

* cited by examiner

*Primary Examiner* — Xuong Chung Trans
(74) *Attorney, Agent, or Firm* — Panasonic Patent Center

(57) ABSTRACT

A multi-directional switch includes switches, a wiring board having an electrode, a pressure-sensitive body disposed over the electrode, a detection pin disposed on the upper surface of the pressure-sensitive body, and an operating body configured to push the detection pin and the switches by being tilted. The degree of a pushing force exerted by the operating body onto the detection pin changes the contact resistance between the pressure-sensitive body and the electrode. The multi-directional switch enables an electronic apparatus connected thereto to perform diverse functions by reflecting changes in the contact resistance.

8 Claims, 15 Drawing Sheets

MULTI-DIRECTIONAL SWITCH

TECHNICAL FIELD

The technical field relates to a multi-directional switch used to operate various electronic apparatuses.

BACKGROUND ART

In-car and portable electronic apparatuses such as car audio and car navigation systems and mobile phones are becoming more and more diverse in function in recent years. In line with this trend, multi-directional switches used to operate these apparatuses have been required to have high speed and easy-to-use features.

FIG. 13 is an exploded perspective view of conventional multi-directional switch 10. FIG. 14 is a sectional view of multi-directional switch 10. In these drawings, the dimension in the thickness direction is exaggerated for clarity.

Multi-directional switch 10 includes wiring board 1, two push switches 3, two pins 4, case 5, and operating body 6.

Wiring board 1 has, on its upper surface, a wiring pattern and electrodes 2. Electrodes 2 are substantially square shaped.

Push switches 3 are fixed on electrodes 2 on the upper surface of wiring board 1 by soldering or other means.

Pins 4, which are made of resin, are disposed on the upper surfaces of push switches 3.

Case 5, which is bottomless and made of resin, has two holes 5A, two side walls 5B, and two shafts 5C. Holes 5A are formed at the left and right sides of the upper surface of case 5. Side walls 5B are formed at the front and back on the upper surface of case 5. Shafts 5C project inside side walls 5B.

Case 5 covers pins 4 such that the upper ends of pins 4 project from holes 5A.

Operating body 6, which is made of resin, has trunk 6A, two pressure arms 6B, two bearings 6C, and operating part 6D. Trunk 6A is shaped like an arch. Pressure arms 6B are formed at the left and right ends of trunk 6A. Bearings 6C, which are recesses, are formed in the side walls at the front and back ends of trunk 6A. Operating part 6D, which has a substantially T-shaped cross section, is disposed on the upper surface of trunk 6A.

Operating body 6 is disposed such that shafts 5C are inserted into bearings 6C, and that the bottom surfaces of pressure arms 6B are located over pins 4.

When mounted on, for example, a car steering wheel, multi-directional switch 10 is covered with upper surface cover 11 made of resin. Upper surface cover 11 has oval hole 11A from which operating part 6D of switch 10 is exposed. In this case, multi-directional switch 10 is connected, for example, to a car audio or car navigation system via a cable or other means.

When, for example, selecting a song using the audio system, the user tilts operating part 6D as shown in FIG. 15.

When the user tilts operating part 6D to the right, the right-side pressure arm 6B pushes the right-side pin 4, which then pushes the right-side push switch 3.

As a result, the front display shows some icons representing the corresponding songs. When the audio system detects that the right-side push switch 3 has been pushed, the selection moves to the icon on the right side of the currently selected icon. The user continues to tilt operating part 6D until the selection moves to the icon representing the desired song.

Thus, when the user tilts operating body 6 either to the left or right, pressure arm 6B pushes push switch 3 via pin 4 in the tilt direction of operating part 6D. Multi-directional switch 10 enables an electronic apparatus connected thereto to perform a function desired by the user according to the tilt direction of operating part 6D.

A multi-directional switch similar to conventional multi-directional switch 10 is shown in Japanese Patent Unexamined Publication No. 2006-12695.

SUMMARY

A multi-directional switch includes a plurality of switches, a wiring board having an electrode, a pressure-sensitive body disposed over the electrode, a detection pin disposed on the upper surface of the pressure-sensitive body, and an operating body configured to push the detection pin and the switches by being tilted. The degree of a pushing force exerted by the operating body onto the detection pin changes the contact resistance between the pressure-sensitive body and the electrode.

The multi-directional switch enables an electronic apparatus connected thereto to perform diverse functions by reflecting changes in the contact resistance.

DETAILED DESCRIPTION

First Exemplary Embodiment

Figure 1:
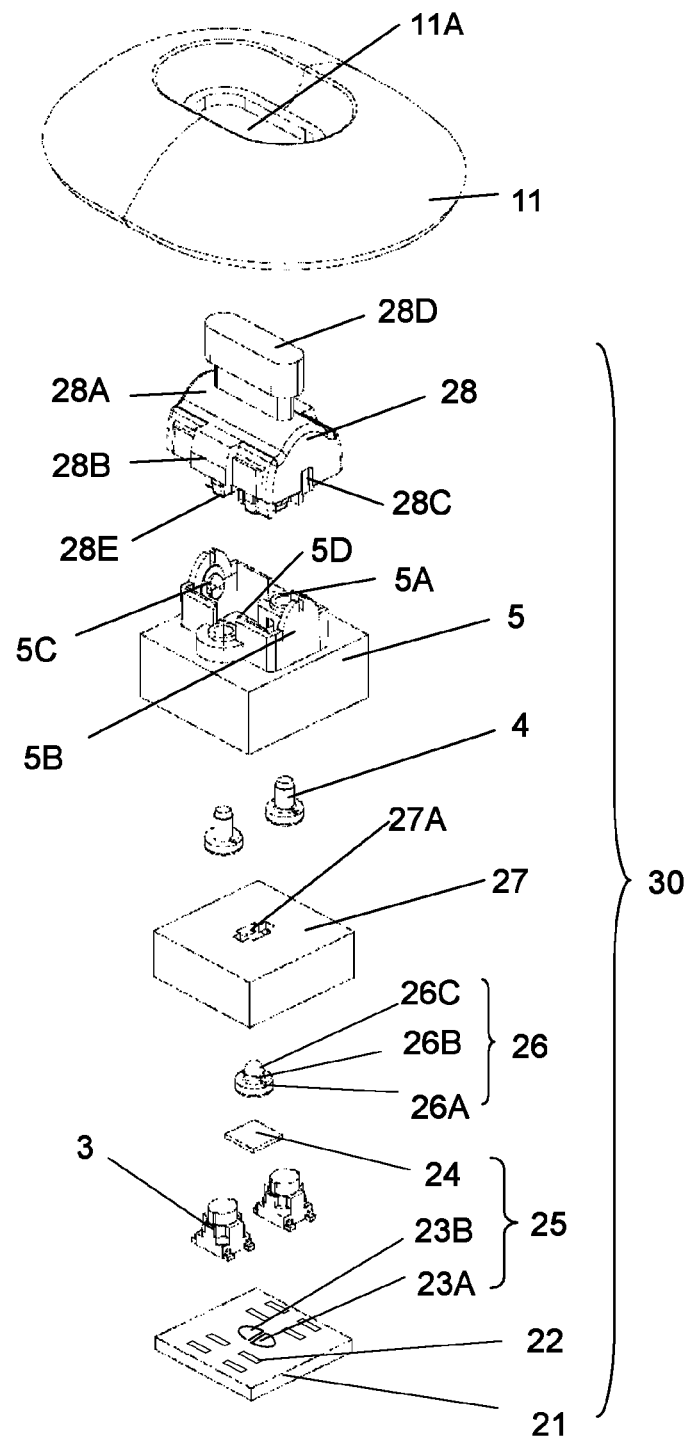
FIG. 1 is an exploded perspective view of a multi-directional switch according to a first exemplary embodiment.
Figure 2:
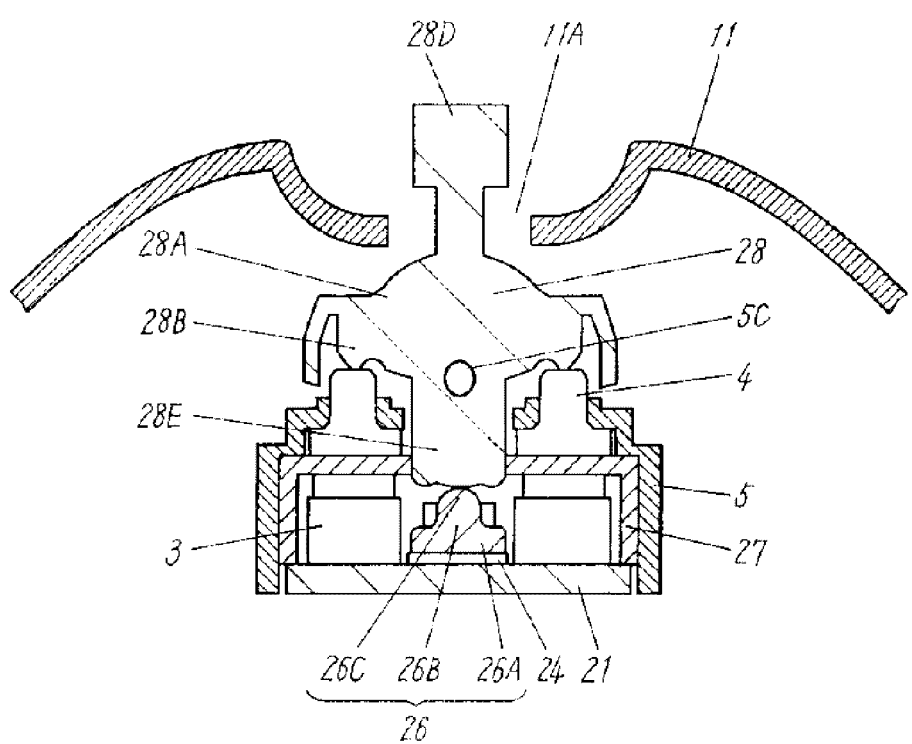
FIG. 2 is a sectional view of the multi-directional switch according to the first exemplary embodiment.

FIG. 1 is an exploded perspective view of multi-directional switch 30 according to a first exemplary embodiment. FIG. 2 is a sectional view of multi-directional switch 30. In FIGS. 1 and 2, the dimension in the thickness direction is exaggerated for clarity. The same or similar components depicted in different figures are denoted by the same reference numerals.

Multi-directional switch 30 includes wiring board 21, two push switches 3, pressure-sensitive switch 25, detection pin 26, elastic body 27, two pins 4, case 5, and operating body 28.

Wiring board 21 has, on its upper surface, a wiring pattern and a total of eight electrodes 22. Four electrodes 22 are provided on each of the left and right sides of the upper surface. Wiring board 21 also has, at the substantial center of its upper surface, a pair of semicircular electrodes 23A and 23B spaced from each other by a predetermined distance.

Push switches 3 are, for example, automatic return switches. Push switches 3 are fixed on electrodes 22 on the upper surface of wiring board 21 by soldering or other means.

Pressure-sensitive switch 25 is formed of pressure-sensitive body 24, and two electrodes 23A and 23B. Pressure-sensitive body 24 is disposed on the upper surfaces of electrodes 23A and 23B on wiring board 21.

Detection pin 26 has pressure part 26A, columnar part 26B, and projecting end 26C. Pressure part 26A has a substantially columnar shape and a flat lower surface. Columnar part 26B, which is also substantially columnar, is disposed on the upper surface of pressure part 26A. Projecting end 26C has a round upper end. Detection pin 26 is made of polyacetal, nylon, or other resins.

Elastic body 27, which is shaped like a bottomless box, has a crisscross hole 27A substantially at the center of its upper surface. Elastic body 27 is made of an elastic material such as, for example, silicone rubber, isoprene rubber, natural rubber, chloroprene rubber, acrylic rubber, nitrile rubber, or ethylene-propylene-diene rubber.

Detection pin 26 is disposed on the upper surface of pressure-sensitive body 24, and is covered with elastic body 27.

As in conventional multi-directional switch 10, pins 4 are made of resin such as polyacetal. Case 5 is bottomless and is made of resin such as acrylonitrile-butadiene-styrene copolymer synthetic resin.

Case 5 has two holes 5A, two side walls 5B, two shafts 5C, and square hole 5D. Holes 5A are formed at the left and right sides of the upper surface of case 5. Side walls 5B are formed at the front and back on the upper surface of case 5. Shafts 5C roundly project inside side walls 5B. Square hole 5D is formed between side walls 5B.

Pins 4 are disposed at the positions of the upper surface of elastic body 27 that are just over left and right push switches 3. Case 5 covers pins 4 such that the upper ends of pins 4 project from left and right holes 5A of case 5.

Operating body 28, which is made of resin, has trunk 28A, two pressure arms 28B, two bearings 28C, operating part 28D, and swing part 28E. Trunk 28A is shaped like an arch. Pressure arms 28B are formed at the left and right ends of trunk 28A. Bearings 28C, which are recesses, are formed in the side walls at the front and back ends of trunk 28A. Operating part 28D, which has a substantially T-shaped cross section, is disposed on the upper surface of trunk 28A. Swing part 28E, which is bar-like, is located at the position of the lower surface of trunk 28A that is under operating part 28D.

Operating body 28 is disposed such that shafts 5C are inserted into bearings 28C, and that the bottom surfaces of pressure arms 28B are located over pins 4. Swing part 28E is inserted into case 5 through square hole 5D. The lower end of swing part 28E is in contact with the upper end of detection pin 26.

Figure 3:
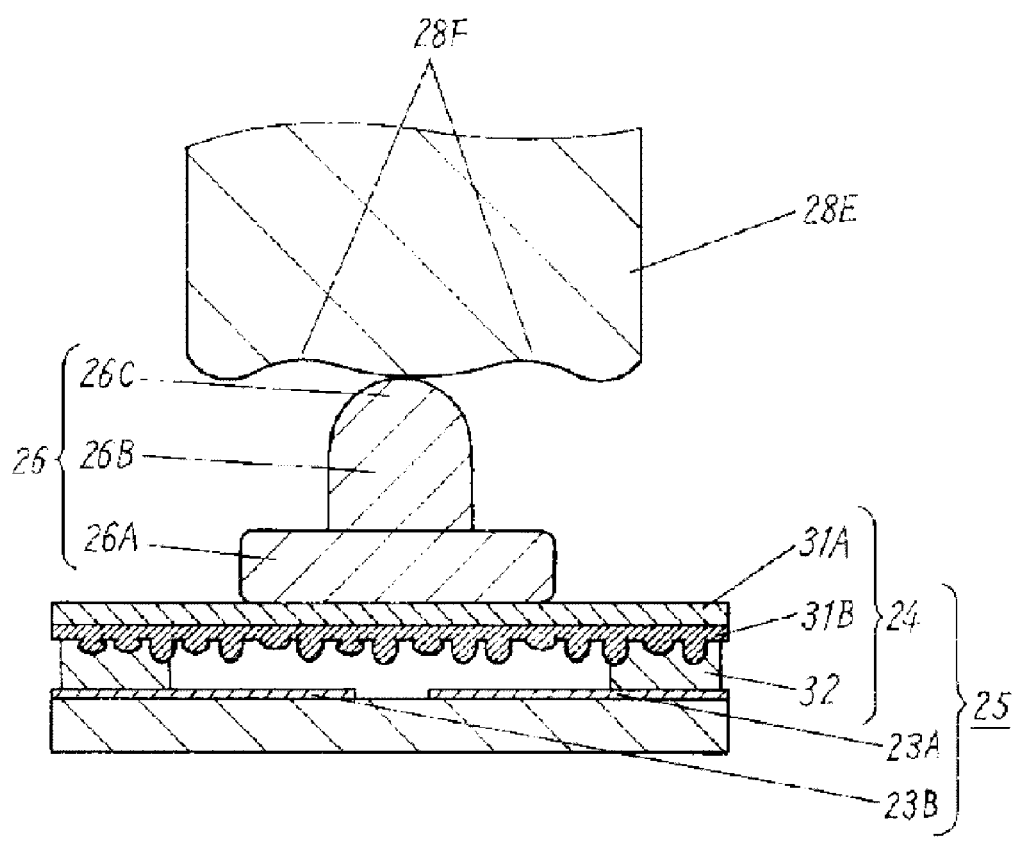
FIG. 3 is a sectional view of an essential part of the multi-directional switch according to the first exemplary embodiment.

Swing part 28E, detection pin 26, and pressure-sensitive switch 25 will be described in detail with reference to FIG. 3.

Pressure-sensitive body 24 of pressure-sensitive switch 25 has low resistive layer 31A, high resistive layer 31B, and spacer 32. Low resistive layer 31A is made of synthetic resin with carbon powder dispersed therein, and has a sheet resistance of 0.5 k$\Omega$/sq. to 30 k$\Omega$/sq. Low resistive layer 31A is printed on the lower surface of a film. High resistive layer 31B has minute asperities on its entire lower surface, and has a sheet resistance of 50 k$\Omega$/sq. to 5 M$\Omega$/sq. High resistive layer 31B is printed on the lower surface of low resistive layer 31A. Spacer 32 formed of an insulating film having holes at predetermined positions is pasted on the lower surface of high resistive layer 31B.

Pressure-sensitive body 24 is disposed on the upper surfaces of electrodes 23A and 23B such that the holes of spacer 32 are located over electrodes 23A and 23B. In other words, high resistive layer 31B can be attached and detached to/from electrodes 23A and 23B.

As a result, the higher the compressive force applied to pressure-sensitive body 24, the larger the contact area between high resistive layer 31B and electrodes 23A, 23B becomes. This reduces the contact resistance between electrodes 23A and 23B via high resistive layer 31B.

Detection pin 26 is disposed on the upper surface of pressure-sensitive body 24 such that the flat lower surface of pressure part 26A can push the upper surface of pressure-sensitive body 24. In this case, projecting end 26C of detection pin 26 is in contact with swing part 28E. Swing part 28E has two gentle hollows 28F at the positions where the lower end of swing part 28E comes into contact with projecting end 26C. When swing part 28E swings, projecting end 26C slides inside hollows 28F.

Figure 4:
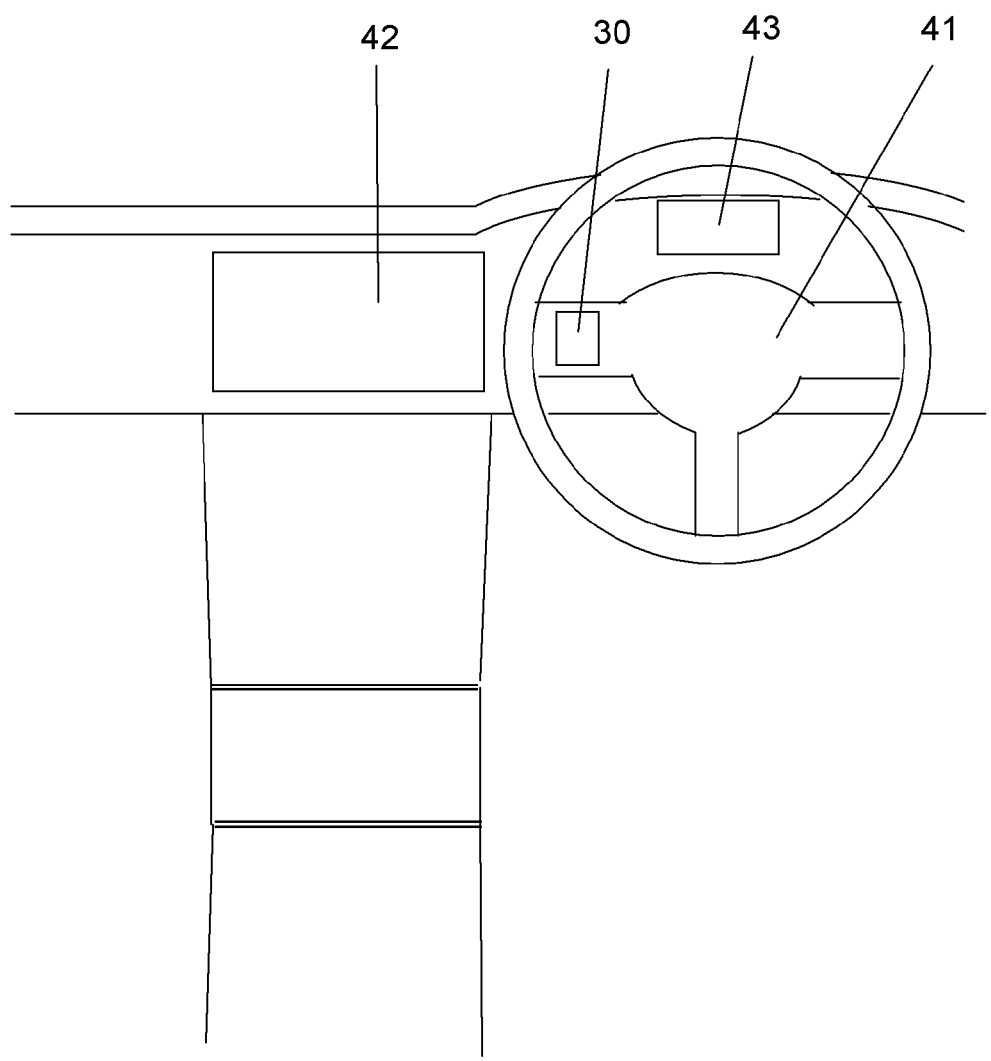
FIG. 4 shows a state in which the multi-directional switch according to the first exemplary embodiment is in operation.

When mounted on, for example, car steering wheel 41 as shown in FIG. 4, multi-directional switch 30 is covered with upper surface cover 11 made of resin. Upper surface cover 11 has oval hole 11A from which operating part 28D of switch 30 is exposed. In this case, multi-directional switch 30 is connected, for example, to display 42 at the front center, or display panel 43 behind steering wheel 41 of a car audio or car navigation system via a cable or other means.

When the user tilts operating part 28D of operating body 28 of multi-directional switch 30, while watching display 42 or display panel 43, the electronic apparatus mounted with multi-directional switch 30 performs a function desired by the user.

The operation of multi-directional switch 30 in this case will be described with reference to FIGS. 5A, 5B, 6A and 6B.

Figure 5A:
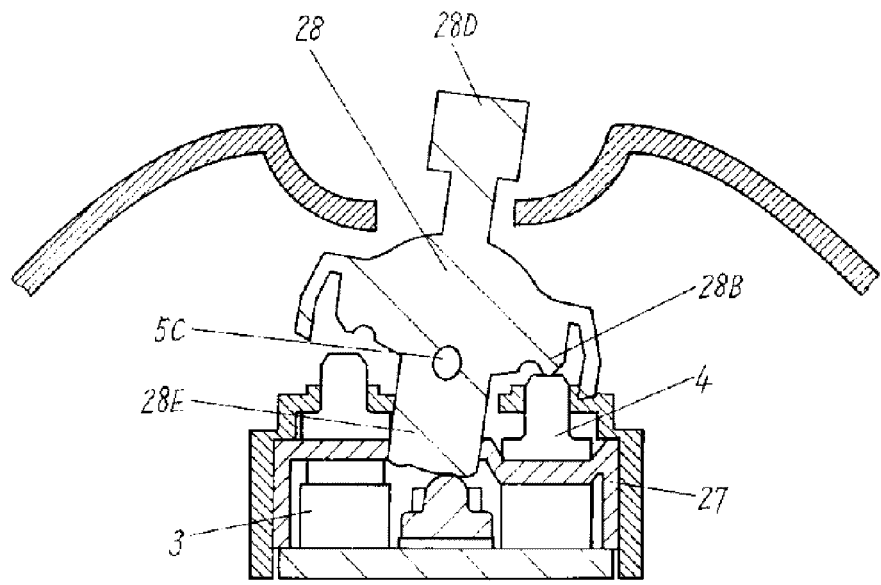
FIGS. 5A and 5B are sectional views in which the multi-directional switch according to the first exemplary embodiment is in operation.

Assume that the user tilts operating part 28D of operating body 28 to the right with a finger as shown in FIG. 5A. In this case, operating body 28 tilts to the right around shafts 5C.

Then, the bottom surface of pressure arm 28B pushes pin 4 from above. The bottom surface of pin 4 pushes push switch 3 via elastic body 27. As a result, push switch 3 is placed into the "on" state.

The material of elastic body 27 and the characteristics of push switches 3 are selected such that the returning force of push switches 3 are smaller than the force required to compressively deform elastic body 27. This allows push switch 3 to be held in the "on" state.

Thus, push switch 3 provides a tactile feel to the user via operating part 28D. The user can recognize the time when push switch 3 is turned on.

Figure 6A:
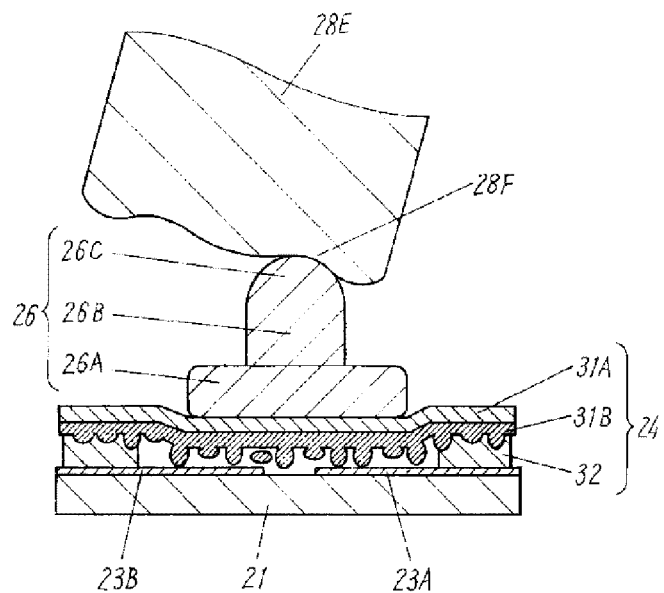
FIGS. 6A and 6B are sectional views of an essential part in which the multi-directional switch according to the first exemplary embodiment is in operation.

When the user tilts operating body 28 to the right, swing part 28E swings to the left. As shown in FIG. 6A, the upper end of projecting end 26C slides inside hollows 28F at the lower end of swing part 28E.

Hollows 28F slightly reduce the downward motion of detection pin 26. Therefore, the upper surface of pressure-sensitive body 24 is only slightly dented by the reduced compressive force of pressure part 26A.

At this moment, high resistive layer 31B is in loose contact with electrodes 23A and 23B. The contact resistance between electrodes 23A and 23B is slightly lower than in the case shown in FIG. 3, but is higher than in the case shown in FIG. 6B, which will be described later.

As described above, when the user tilts operating part 28D down, push switch 3 is placed into the "on" state to provide the user with a tactile feel. High resistive layer 31B is in loose contact with electrodes 23A and 23B. Therefore, the contact resistance between electrodes 23A and 23B is slightly lower than in the case shown in FIG. 3.

Figure 5B:
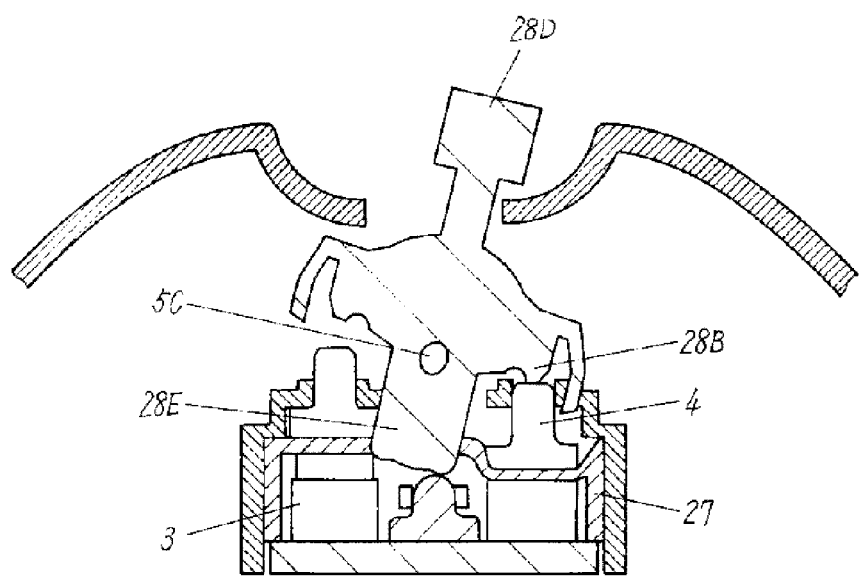

Next, when the user tilts operating part 28D further to the right so as to change its state from FIG. 5A to FIG. 5B, the bottom surface of pressure arm 28B pushes elastic body 27 down via pin 4.

Since push switch 3 is already in the "on" state, the upper surface of push switch 3 is not lowered. Instead, elastic body 27 is compressed between the upper surface of push switch 3 and the bottom surface of pin 4.

Figure 6B:
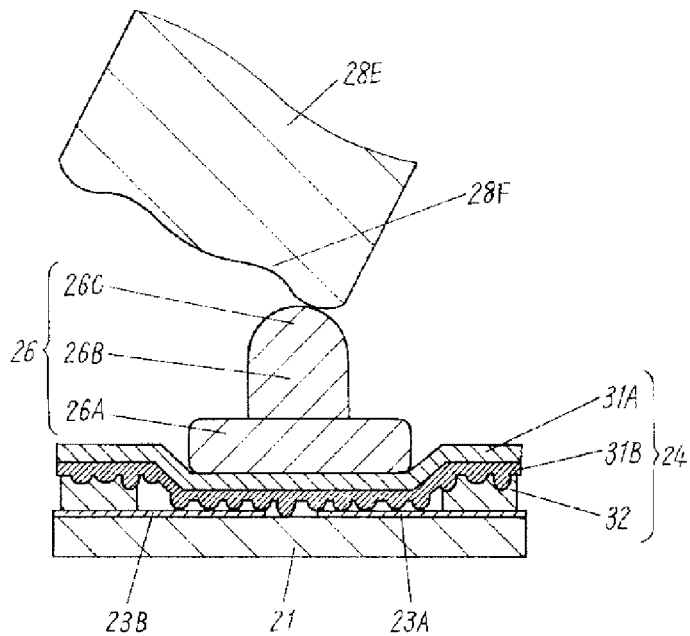

As a result, operating body 28 is further tilted around shafts 5C, thereby swinging swing part 28E. As shown in FIG. 6B, projecting end 26C slides inside hollows 28F.

The upper end of projecting end 26C slides inside hollows 28F to move from the most dented point of hollows 28F shown in FIG. 6A to the most projecting point of the lower end of swing part 28E shown in FIG. 6B. Detection pin 26 can push pressure-sensitive body 24 strongly or softly with respect to the angle at which swing part 28E swings, that is, to the tilt angle of operating part 28D.

The downward motion of detection pin 26 pushes the asperities of the lower surface of high resistive layer 31B against electrodes 23A and 23B. The lower the detection pin 26 moves, the larger the contact area between high resistive layer 31B and electrodes 23A, 23B becomes. This reduces the contact resistance between electrodes 23A and 23B.

Thus, when push switch 3 is in the "on" state and the user tilts operating body 28, operating body 28 pushes detection pin 26. As a result, detection pin 26 pushes the upper surface of pressure-sensitive body 24. In this case, the degree of pushing force of detection pin 26 changes the contact resistance between pressure-sensitive body 24 and electrodes 23A, 23B, that is, between electrodes 23A and 23B.

As described above, swing part 28E has hollows 28F at its lower end. Changing the shape of hollows 28F can control the distance of detection pin 26 moving downward with respect to the tilt angle of operating body 28. This can change the contact resistance between electrodes 23A and 23B with respect to the tilt angle of operating body 28.

When the user's force is released, operating part 28D of operating body 28 returns to the neutral position as shown in FIG. 2 due to the returning force of push switch 3 and the elastic returning force of elastic body 27.

The elastic returning force of elastic body 27 is larger than the returning force of push switch 3. This allows elastic body 27 to return from the compressed state while push switch 3 is held in the "on" state. Then, push switch 3 returns to the "off" state.

The user has tilted operating part 28D to the right in the above description, but multi-directional switch 30 operates in the same manner when the user tilts operating part 28D to the left.

Figure 7:
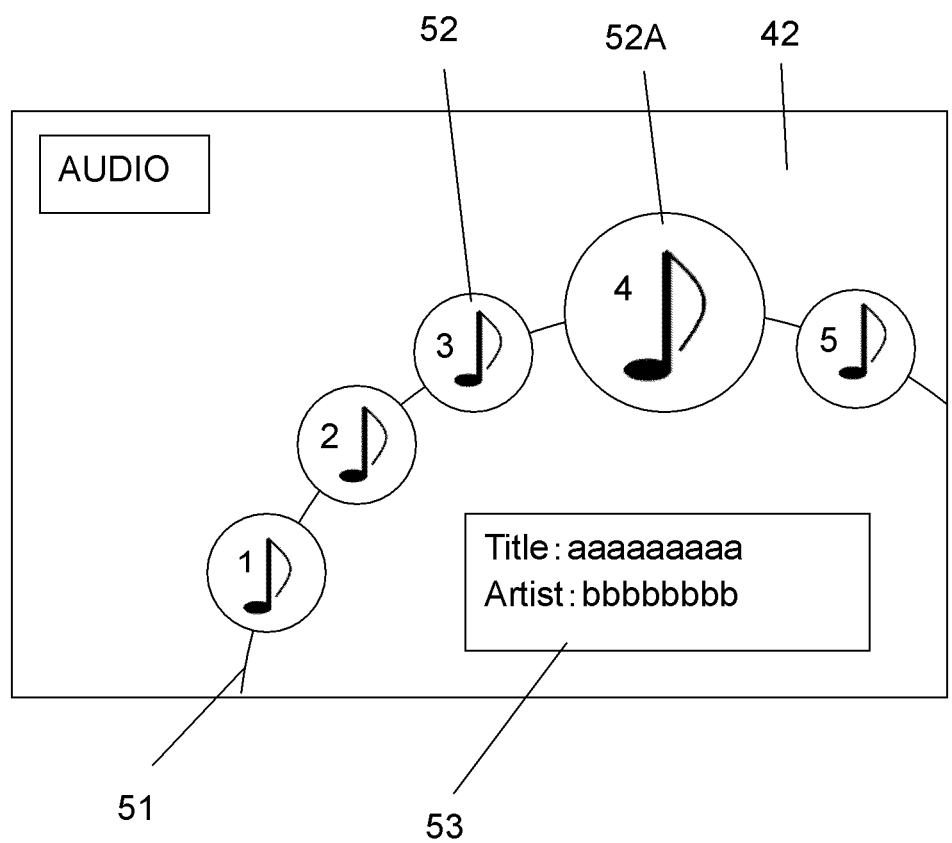
FIG. 7 shows the display of an electronic apparatus using the multi-directional switch according to the first exemplary embodiment.

Such operation of operating part 28D can be performed to select songs in the audio system shown in FIG. 7. Display 42 shows arc-shaped rotating wheel 51 having thereon circular icons 52 with musical notes. Icon 52A, which is slightly larger than the other icons 52, shows the song that is currently selected.

Display 42 has title display part 53 showing the title and singer of the song corresponding to icon 52A.

When the user tilts operating part 28D to the right so as to turn on push switch 3, rotating wheel 51 rotates to the right. As a result, the selection sequentially moves to icons 52 on the left side of icon 52A.

The display on display 42 is controlled by, for example, a microcomputer of the audio system. The speed of rotating wheel 51, that is, the speed at which the selection moves from one icon 52 to the next increases with decreasing contact resistance between electrodes 23A and 23B.

When the user tilts operating part 28D to the left, rotating wheel 51 rotates to the left. The selection sequentially moves to the right-side icons 52. The speed at which the selection moves from one icon 52 to the next changes according to the tilt angle of operating part 28D.

As described above, changing the tilt angle of operating body 28 can change the speed at which the selection moves from one icon 52 to the next. When a desired icon 52 is far away, the user can increase the tilt angle in order to increase the speed at which the selection moves. When the desired icon 52 comes close, the user can increase or decrease the speed at which the selection moves by increasing or decreasing the tilt angle. Thus, multi-directional switch 30 can perform diverse functions according to the desire of the user.

Low and high resistive layers 31A and 31B may be replaced by a pressure-sensitive conductive layer formed of a base made of, for example, silicone rubber, and conductive particles such as carbon powder dispersed in the base. Pressure-sensitive body 24 may be formed of any material as long as it can either increase or decrease the contact resistance between electrodes 23A and 23B along with an increase in the compressive force.

Push switches 3 may be replaced by slide switches which can be slid by operating body 28.

As described above, multi-directional switch 30 of the present exemplary embodiment includes switches such as push switches 3, wiring board 21 having electrodes 22 thereon, pressure-sensitive body 24 disposed over electrodes 22, detection pin 26 disposed on the upper surface of pressure-sensitive body 24, and operating body 28 for pushing detection pin 26 and push switches 3 when tilted by the user. The contact resistance between pressure-sensitive body 24 and electrodes 22 is changed by changing the degree of pushing force of detection pin 26. The electronic apparatus connected to multi-directional switch 30 can perform a display which reflects the changes in the contact resistance of switch 30. Thus, multi-directional switch 30 easily performs diverse functions which reflect the tilt angle of operating body 28.

Multi-directional switch 30 further includes elastic body 27 between the switches and operating body 28. Operating body 28 pushes the switches via elastic body 27. The elastic returning force of elastic body 27 is designed to be larger than the returning force of the switches. This allows pressure-sensitive body 24 to be pushed while a switch is in the "on" state. Thus, multi-directional switch 30 can easily adjust the stroke to push pressure-sensitive body 24.

Operating body 28 of multi-directional switch 30 has swing part 28E which swings according to the tilt angle of operating part 28D. Swing part 28E pushes detection pin 26. Swing part 28E has hollows 28F on its surface that come into contact with detection pin 26. Providing hollows 28F and changing their shapes can control the distance of detection pin 26 moving downward with respect to the tilt angle of operating body 28. Multi-directional switch 30, which can freely change the contact resistance with respect to the tilt angle of operating body 28, is applicable to various electronic apparatuses.

Second Exemplary Embodiment

Figure 8:
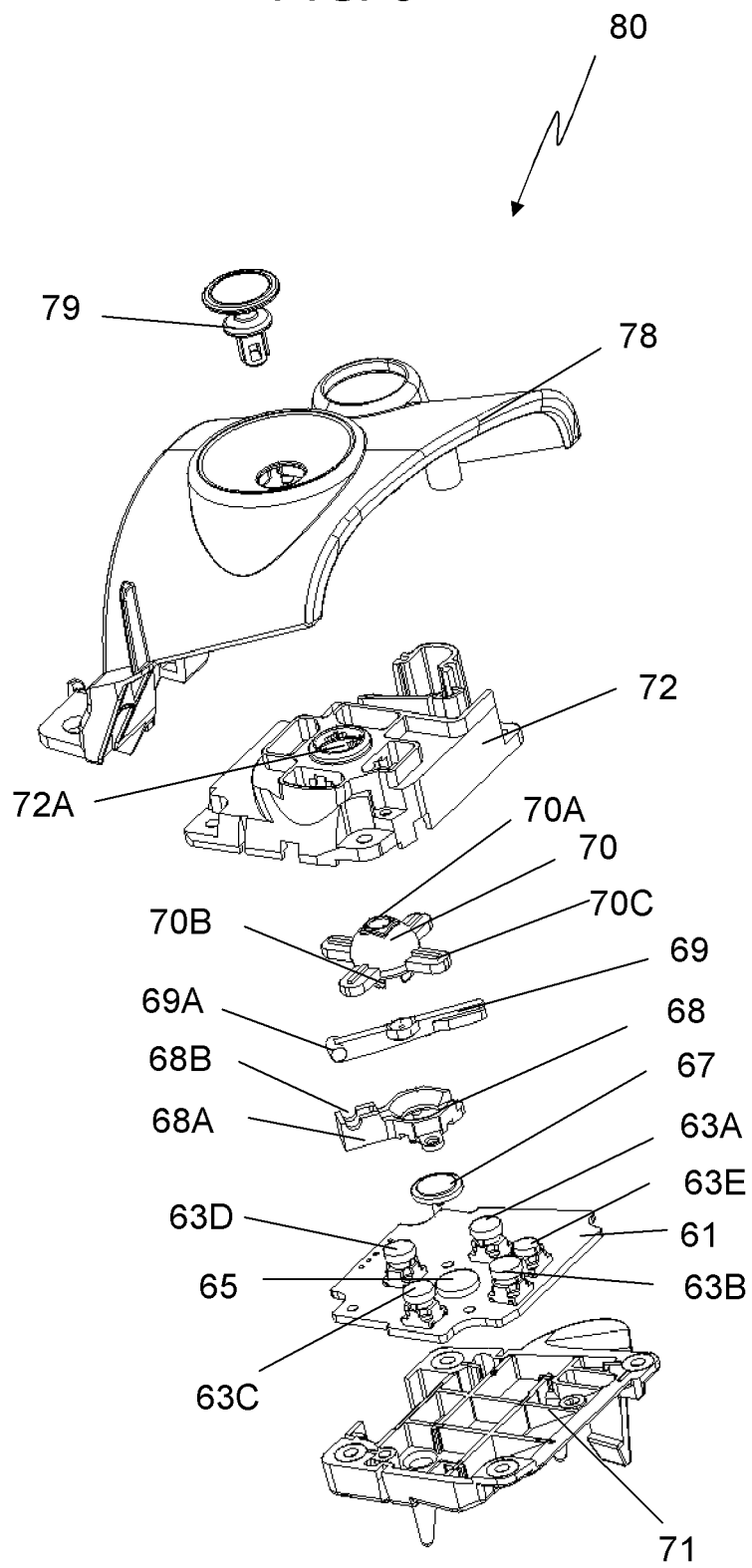
FIG. 8 is an exploded perspective view of a multi-directional switch according to a second exemplary embodiment.
Figure 9:
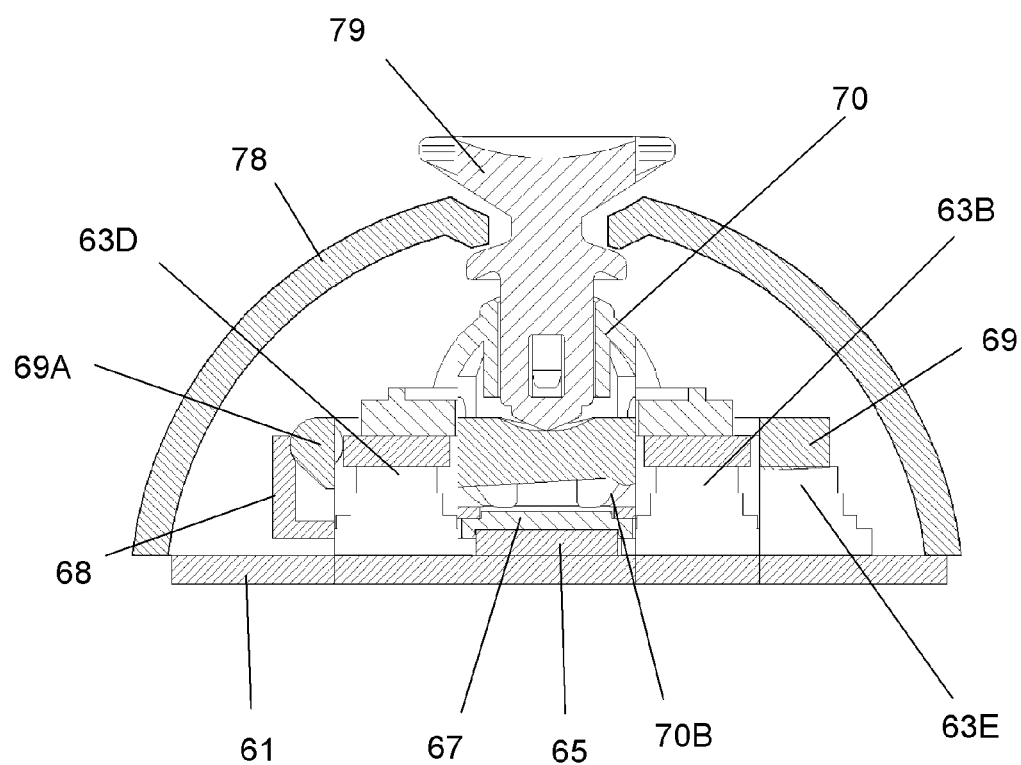
FIG. 9 is a sectional view of an essential part of the multi-directional switch according to the second exemplary embodiment.
Figure 10:
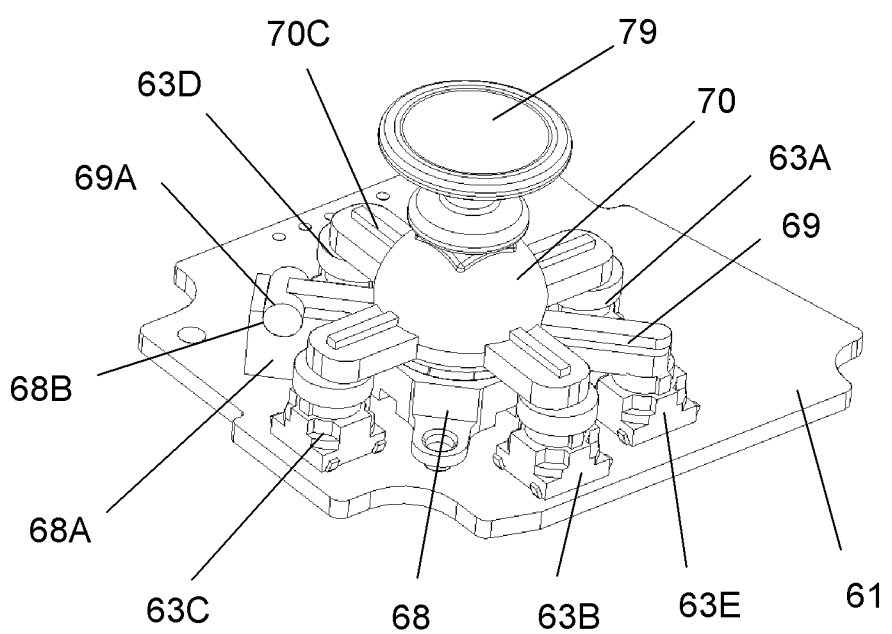
FIG. 10 is a perspective view of the essential part of the multi-directional switch according to the second exemplary embodiment.

FIG. 8 is an exploded perspective view of multi-directional switch 80 according to a second exemplary embodiment. FIGS. 9 and 10 are a sectional view and a perspective view, respectively, of an essential part of switch 80.

Multi-directional switch 80 mainly differs from multi-directional switch 30 of the first exemplary embodiment in the following two aspects. Operating body 79 can be tilted not only left and right but also back and forth, and operating body 79 can be pushed down to turn on push switch 63E.

Multi-directional switch 80 includes wiring board 61, push switches 63A-63E, pressure-sensitive switch 65, elastic body 67, support body 68, tilting body 69, movable body 70, lower case 71, upper case 72, upper surface cover 78, and operating body 79.

Wiring board 61 has, on its upper surface, a wiring pattern, push switches 63A-63E, and pressure-sensitive switch 65. Push switches 63A-63D are arranged on the front, back, left, and right sides of the upper surface of wiring board 61. Push switch 63E is located between push switches 63A and 63B. Pressure-sensitive switch 65 is surrounded by push switches 63A-63D, which are another example of the switches.

Similar to pressure-sensitive switch 25 of the first exemplary embodiment, pressure-sensitive switch 65 is formed of electrodes disposed on the upper surface of wiring board 61, and the pressure-sensitive body disposed over these electrodes. The pressure-sensitive body is pushed by the compressive force applied to the upper surface of pressure-sensitive switch 65, thereby reducing the contact resistance between the electrodes. Elastic body 67 is disposed on the upper surface of pressure-sensitive switch 65. Elastic body 67 is preferably made of an elastic material such as silicone rubber, isoprene rubber, natural rubber, chloroprene rubber, acrylic rubber, nitrile rubber, or ethylene-propylene-diene rubber.

Support body 68 is substantially cylindrical and has projection 68A projecting in the outer diameter direction. Projection 68A has, on its upper surface, substantially semicircular depression 68B.

Tilting body 69, which is bar-shaped, has cylindrical fulcrum 69A at its one end. Fulcrum 69A is fitted into depression 68B, so that tilting body 69 can tilt on support body 68. The other end of tilting body 69 is located over push switch 63E. Push switch 63E is pushed by the tilt of tilting body 69.

Movable body 70 has hole part 70A, four pressure parts 70B, and four tilting parts 70C. Hole part 70A is formed in the upper surface of movable body 70. Pressure parts 70B project downward from the lower surface of movable body 70. Tilting parts 70C, which are planar, project from the dome-shaped bottom surface of movable body 70 in the front, back, left, and right directions, respectively.

Movable body 70 is combined with support body 68 via tilting body 69. When movable body 70 moves on support body 68, tilting part 70C in the tilt direction pushes push switches 63A-63D. Then, pressure part 70B in the tilt direction pushes pressure-sensitive switch 65 via elastic body 67.

Support body 68, tilting body 69, and movable body 70 are preferably made of a resin such as acrylonitrile butadiene styrene copolymer synthetic resin, polyacetal, nylon, or polycarbonate.

Elastic body 67, support body 68, tilting body 69, and movable body 70 are combined on wiring board 61 between lower case 71 and upper case 72. Upper case 72 has hole part 72A from which the upper surface of movable body 70 is exposed.

Upper surface cover 78 is shaped like a curved plate, and operating body 79 is in the form of a pin. Upper surface cover 78 covers upper case 72. The lower end of operating body 79 is inserted into hole part 70A of movable body 70.

Lower case 71, upper case 72, upper surface cover 78, and operating body 79 are preferably made of a resin such as acrylonitrile butadiene styrene copolymer synthetic resin, polyacetal, nylon, or polycarbonate.

Thus, when the user tilts operating body 79, one of the four push switches 63A-63D that is in the tilt direction is pushed and turned on. At the same time, pressure-sensitive switch 65 is also pushed.

When the user pushes operating body 79 down, on the other hand, tilting body 69 is tilted to push and turn on push switch 63E.

The operation when the user tilts or pushes operating body 79 will be described as follows with reference to FIGS. 11 and 12.

Figure 11:
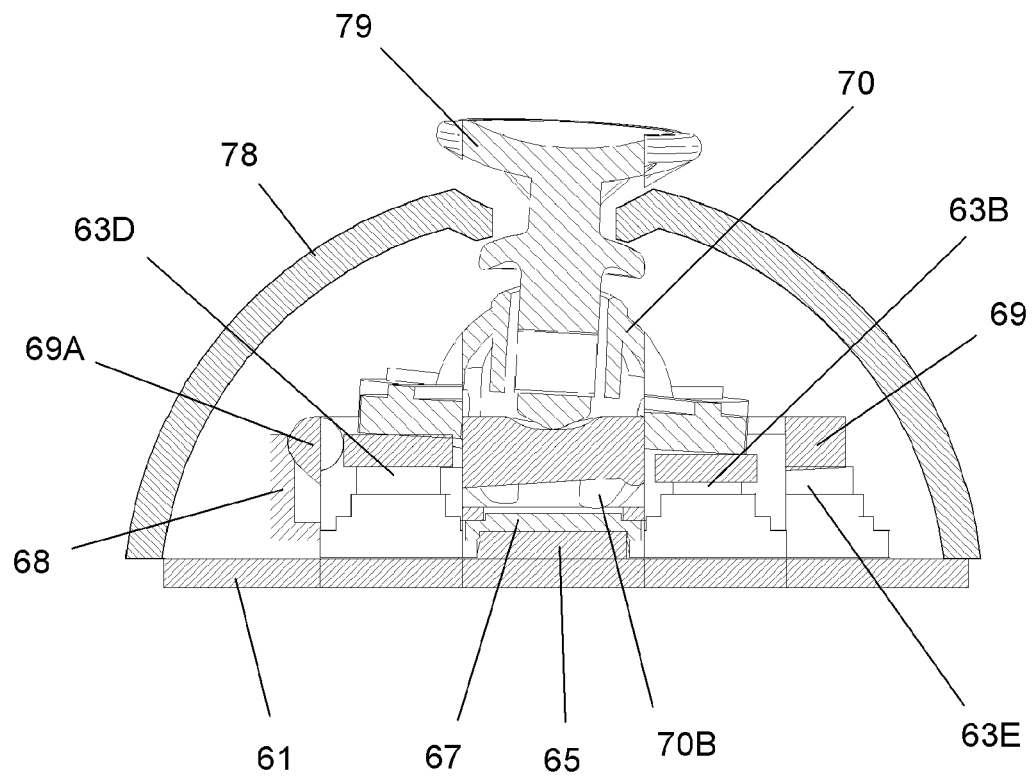
FIG. 11 is a sectional view of the essential part in which the multi-directional switch according to the second exemplary embodiment is in operation.

FIG. 11 is a sectional view of the essential part when the user tilts operating body 79 to the right. Movable body 70 connected to operating body 79 rotates to the right, allowing push switch 63B to be pushed by tilting part 70C. As a result, push switch 63B is turned on. At this moment, pressure part 70B pushes the upper surface of elastic body 67 by a very low compressive force.

When the user tilts operating body 79 further to the right, the larger the tilt angle, the higher the compressive force generated by the pressure part 70B. Pressure-sensitive switch 65 detects the compressive force applied to the pressure-sensitive body.

When the user tilts operating body 79 in one of the four directions: front, back, left, and right, one of push switches 63A-63D that corresponds to the tilt direction is turned on. When the user tilts operating body 79 in a direction between two of the front, back, left, and right directions, two of push switches 63A-63D that sandwich the tilt direction are turned on. Thus, multi-directional switch 80 can be operated in the eight directions.

Figure 12:
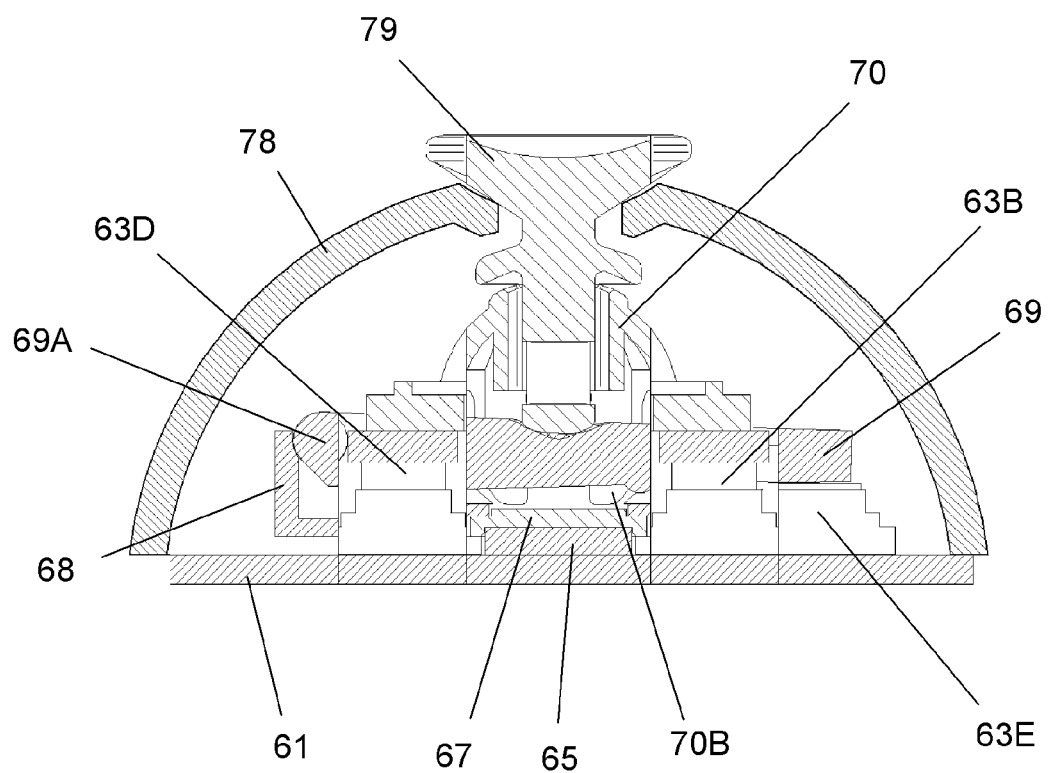
FIG. 12 is another sectional view of the essential part in which the multi-directional switch according to the second exemplary embodiment is in operation.
Figure 13:
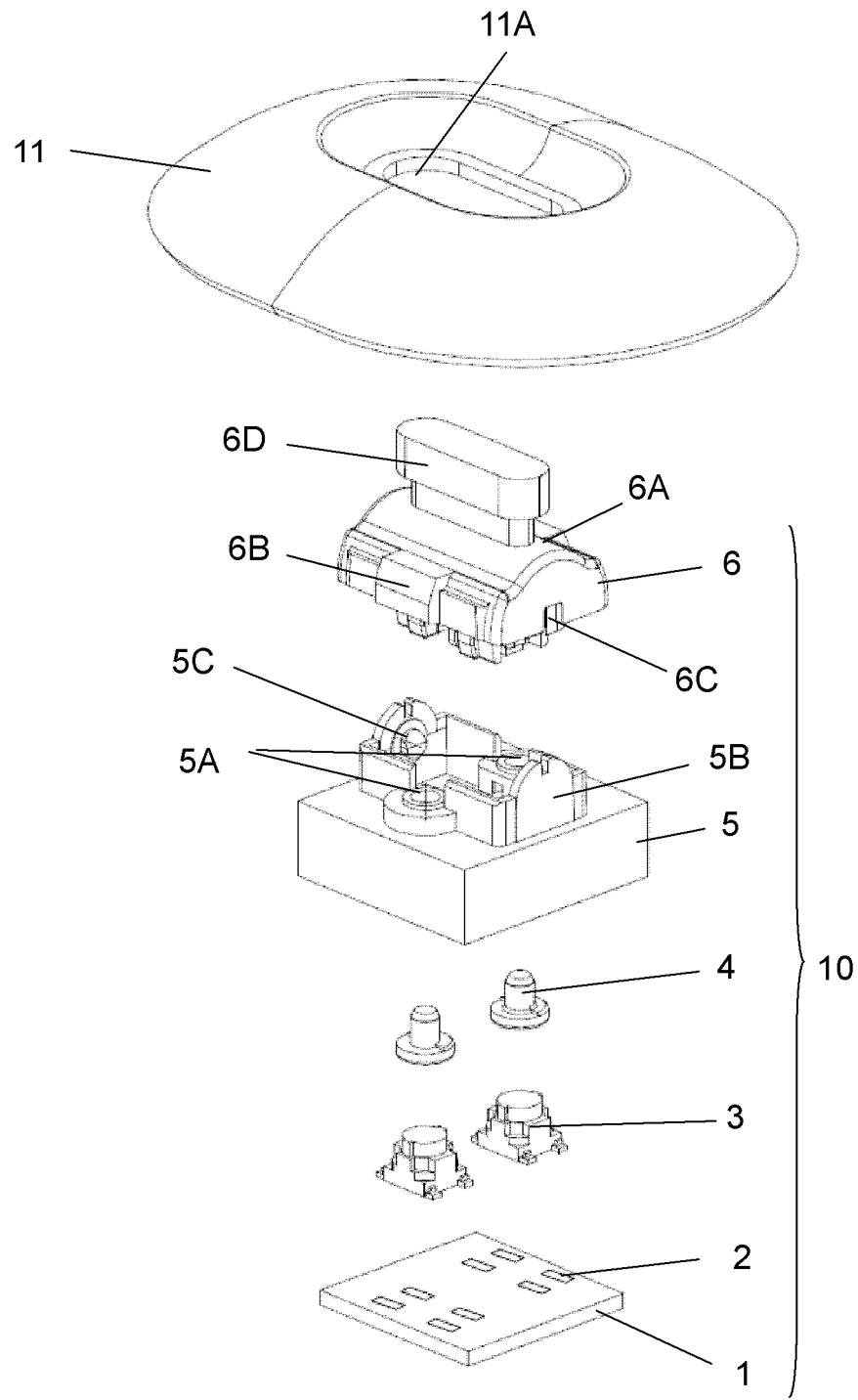
FIG. 13 is an exploded perspective view of a conventional multi-directional switch.
Figure 14:
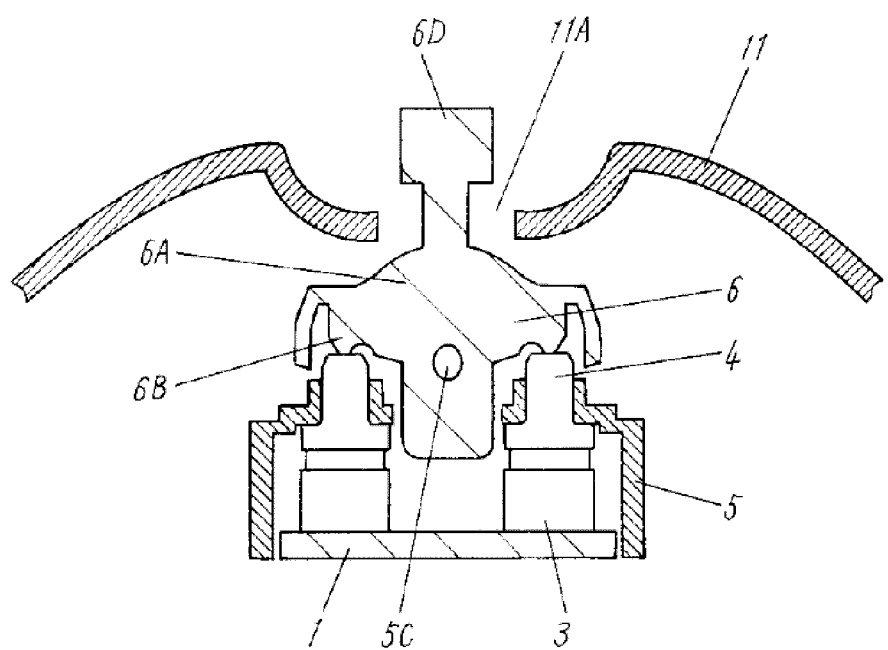
FIG. 14 is a sectional view of the conventional multi-directional switch.
Figure 15:
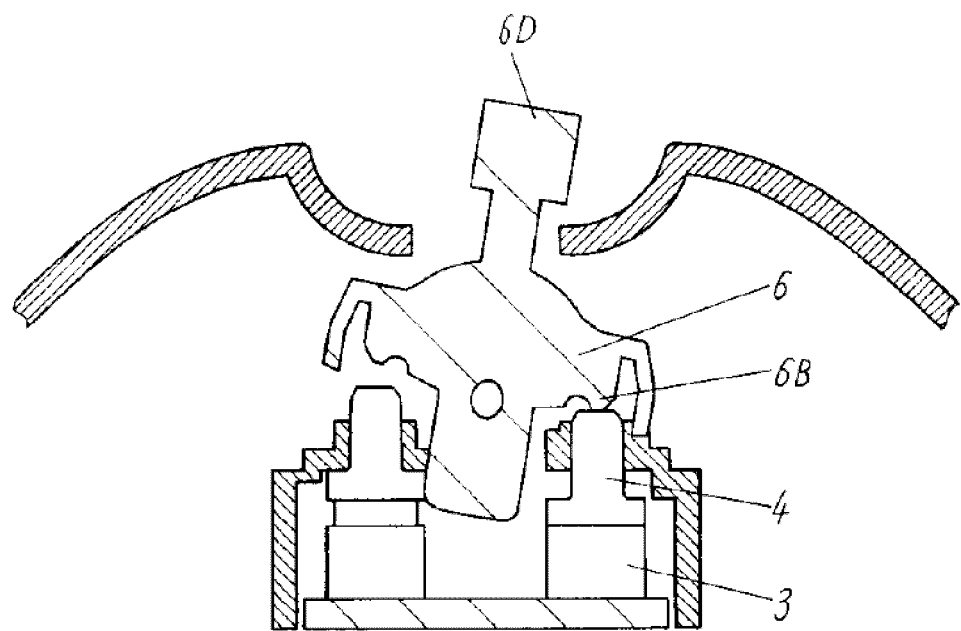
FIG. 15 is a sectional view in which the conventional multi-directional switch is in operation.

FIG. 12 is a sectional view of the essential part when the user pushes operating body 79 down. In this case, movable body 70 connected to operating body 79 also moves downward so as to push and tilt tilting body 69. Tilting body 69 then pushes and turns on push switch 63E.

Such operation of operating body 79 is performed, for example, to move the pointer for setting a destination on the map display screen of the car navigation system. In this case, the microcomputer of the car navigation system detects that one or two of push switches 63A-63D of multi-directional switch 80 have been turned on. The microcomputer also detects the magnitude of the compressive force applied to pressure-sensitive switch 65.

Then, the microcomputer of the car navigation system displays the pointer on the map display screen. The pointer moves in the direction in which the user operates operating body 79 and at the speed according to the tilt angle of operating body 79. When the user pushes operating body 79 down, push switch 63E is turned on to determine the destination.

Thus in the present exemplary embodiment, wiring board 61 has thereon at least four switches such as push switches 63A-63D. Pressure-sensitive switch 65 has a pressure-sensitive body. When the user further tilts operating body 79 after one of the switches is pushed, a higher compressive force is applied to the pressure-sensitive body. Multi-directional switch 80 designed to operate in four or more directions needs only one pressure-sensitive body, thereby performing diverse functions in a simple structure.

What is claimed is:

1. A multi-directional switch comprising:
   a plurality of switches;
   a wiring board having an electrode;
   a pressure-sensitive body disposed over the electrode;
   a detection pin disposed on an upper surface of the pressure-sensitive body, the pressure-sensitive body and the detection pin are disposed between the plurality of switches; and
   an operating body configured to push the detection pin to produce contact between the pressure-sensitive body and the electrode, and push one of the switches to an ON state by being tilted in a single direction.

2. The multi-directional switch of claim 1, further comprising
   an elastic body disposed between the switches and the operating body, wherein
   the operating body is configured to push the switches via the elastic body; and an elastic returning force of the elastic body is larger than a returning force of the switches.

3. The multi-directional switch of claim 1, wherein
   the operating body has a swing part configured to swing according to a tilt angle of the operating body, and then push the detection pin, the swing part having a hollow portion on a surface thereof, the surface being in contact with the detection pin.

4. The multi-directional switch of claim 1, wherein
   the wiring board has at least four switches;
   the number of the pressure-sensitive body is one; and
   when the operating body is tilted after one of the switches is pushed, a higher compressive force is applied to the pressure-sensitive body.

5. A multi-directional switch comprising:
   a plurality of switches;
   a wiring board having an electrode;
   a pressure-sensitive body disposed over the electrode;
   a detection pin disposed on an upper surface of the pressure-sensitive body, the pressure-sensitive body and the detection pin are disposed between the plurality of switches; and
   an operating body configured to push the detection pin and one of the plurality of switches by being tilted in a single direction, wherein:
   a first predetermined tilt angle of the operating body in the single direction pushes the one of the switches to an ON state and pushes the detection pin to produce a first contact area between the pressure-sensitive body and the electrode; and
   a second predetermined tilt angle of the operating body in the single direction pushes the one of the switches to an ON state and pushes the detection pin to produce a second contact area between the pressure-sensitive body and the electrode.

6. The multi-directional switch of claim 5, wherein
   the second predetermined tilt angle is larger than the first predetermined tilt angle and the second contact area is larger than the first contact area.

7. The multi-directional switch of claim 6, wherein
   the operating body has a swing part configured to swing and push the detection pin onto the pressure sensitive body according to a tilt angle of the operating body, and a pushing force of the detection pin onto the pressure sensitive body is larger when the operating body is positioned at the second predetermined tilt angle than the first predetermined tilt angle.

8. The multi-dimensional switch of claim 1, wherein
   a contact area between the pressure-sensitive body and the electrode changes according to a tilt angle of the operating body.

* * * * *